United States Patent
Schabasser

(10) Patent No.: US 11,226,038 B2
(45) Date of Patent: Jan. 18, 2022

(54) FLANGE SEALING SYSTEM AND METHOD OF ASSEMBLING SAME

(71) Applicant: VOITH PATENT GMBH, Heidenheim (DE)

(72) Inventor: Martin Schabasser, Pfaffing (AT)

(73) Assignee: Voith Patent GmbH, Heidenheim (DE)

( * ) Notice: Subject to any disclaimer, the term of this patent is extended or adjusted under 35 U.S.C. 154(b) by 166 days.

(21) Appl. No.: 16/610,603

(22) PCT Filed: Apr. 27, 2018

(86) PCT No.: PCT/EP2018/060831
§ 371 (c)(1),
(2) Date: Nov. 4, 2019

(87) PCT Pub. No.: WO2018/202565
PCT Pub. Date: Nov. 8, 2018

(65) Prior Publication Data
US 2020/0063867 A1    Feb. 27, 2020

(30) Foreign Application Priority Data
May 3, 2017   (DE) .................... 10 2017 109 449.0

(51) Int. Cl.
*F16J 15/10*    (2006.01)
*F16J 15/02*    (2006.01)

(52) U.S. Cl.
CPC .......... *F16J 15/104* (2013.01); *F16J 15/027* (2013.01); *F16J 15/108* (2013.01)

(58) Field of Classification Search
CPC .. F16J 15/00; F16J 15/10; F16J 15/104; F16J 15/108; F16J 15/027; F16J 15/02;
(Continued)

(56) References Cited

U.S. PATENT DOCUMENTS 3,095,619 A  *  7/1963  Peterson ................ F16J 15/108
                                                     277/316
4,300,775 A  * 11/1981  Ringel .................... F16J 15/32
                                                     277/589
(Continued)

FOREIGN PATENT DOCUMENTS

CN    101646886 A    2/2010
CN    104428954 A    3/2015
(Continued)

*Primary Examiner* — Nathan Cumar
(74) *Attorney, Agent, or Firm* — Laurence A. Greenberg; Werner H. Stemer; Ralph E. Locher

(57) ABSTRACT

A flange sealing system includes two bodies that each have a respective flat surface and are interconnected so that the surfaces face one another. At least one of the bodies has a groove with parallel side walls recessed into the flat surface. An elastic profile with an H-shaped cross-section is arranged in the groove in such a way that at least a part of the vertical regions of the elastic profile is arranged parallel to the side walls of the groove. In at least one portion of the space between the vertical regions of the elastic profile, a cured liquid is arranged in such a way that the profile is adhesively connected to the groove in the region of the base surface of the groove. The cured liquid is elastic.

18 Claims, 7 Drawing Sheets

(58) Field of Classification Search
CPC .. F16J 15/46; F16J 15/48; F16J 15/021; F16J 15/022
USPC ........................................................ 277/316
See application file for complete search history.

(56) References Cited

U.S. PATENT DOCUMENTS

| | | | | |
|---|---|---|---|---|
| 4,993,722 | A | * | 2/1991 | Gundy ...................... E03F 3/04 |
| | | | | 277/314 |
| 5,071,140 | A | | 12/1991 | Quevedo del Rio |
| 6,328,310 | B1 | * | 12/2001 | Chikaraishi ............ F16J 15/068 |
| | | | | 277/314 |
| 6,439,580 | B1 | * | 8/2002 | Hecht ...................... E03F 3/06 |
| | | | | 138/89 |
| 9,419,369 | B2 | | 8/2016 | Drew et al. |
| 2008/0191426 | A1 | | 8/2008 | Doyle |

FOREIGN PATENT DOCUMENTS

| | | |
|---|---|---|
| DE | 1215454 B | 4/1966 |
| EP | 0921333 A1 | 6/1999 |
| FR | 1335365 A | 8/1963 |
| JP | H08219291 A | 8/1996 |
| JP | H08247293 A | 9/1996 |
| WO | 2005086747 A2 | 9/2005 |

* cited by examiner

FLANGE SEALING SYSTEM AND METHOD OF ASSEMBLING SAME

BACKGROUND OF THE INVENTION

Field of the Invention

The present invention relates to a flange sealing system, i.e. a system for sealing the space between two connected bodies, and to a method of assembling such a system. The flange sealing system comprises the two connected bodies as well as the sealants for sealing the gap between the bodies. The term "flange" here signifies that the two connected bodies each have a respective flat surface on which the two bodies abut one another in such a way that the flat surfaces are approximately parallel to one another. A distance may be furnished between these two surfaces. However, the two bodies may also abut directly against one another, and in this case as well, a seal is necessary because the surface roughness that is usually present results in a gap between the surfaces that requires sealing, even if the two bodies abut directly against one another.

In many technical applications, it is necessary to seal the gap between two surfaces on which two connected bodies abut one another. The best-known and most widely-used sealing system of this type consists of an O-ring that is inserted into a corresponding groove in one of the two bodies. When the two bodies are screwed together, the sealing ring is squeezed and thus seals the gap between the surfaces in the region the ring encloses. This ensures that slight displacements of the bodies relative to one another do not impair the tightness of the seal. However, this approach becomes problematic if the desired course of the seal is not a simple line but instead, for example, has branches. At such locations, seals corresponding to the O-rings must abut one another. These locations are often problematic from an assembly standpoint and also in terms of the tightness that may be reached. Prior art solutions to this problem are known that are based on using one-piece seals that have corresponding branches (see, for example, DE 1 215 454). However, the use of seals that are specially manufactured in this way is often not economically feasible, for example in the case of small series. The inventor's object is to provide a generic sealing system that allows complicated sealing processes to be implemented cost-effectively, while at the same time sealing reliably and being easy to assemble. However, the sealing system according to the invention may also be used advantageously in arrangements that do not have any branches.

SUMMARY OF THE INVENTION

The inventor has recognized that this object may be accomplished by a sealing system with the features as claimed. Advantageous embodiments are set forth in the dependent claims. The method according to the invention for assembling such a sealing system is set forth in the independent method claim. Advantageous embodiments are set forth in the dependent method claims.

The inventor was guided by the idea of replacing the O-ring or a corresponding seal with a curing liquid. However, the inventor has recognized that this is not effective if only the cavity that the groove defines is filled with a curing liquid. After the curing of the liquid there should be no more displacements of the connected bodies, because these displacements would lead to the destruction of the material itself or of the adhesive bond thereof, due to the fixed volume of the cured liquid. This is avoided by inserting an H-shaped profile into the groove, which prevents the curing liquid from coming into contact with the side walls of the groove. In this way, at least a withdrawal of both of the connected bodies may be made possible, because in this case the required volume is available from transverse contraction.

BRIEF DESCRIPTION OF THE SEVERAL VIEWS OF THE DRAWING

The solution according to the invention is explained below with reference to the drawings. The drawings illustrate the following, specifically.

DESCRIPTION OF THE INVENTION

Figure 1:
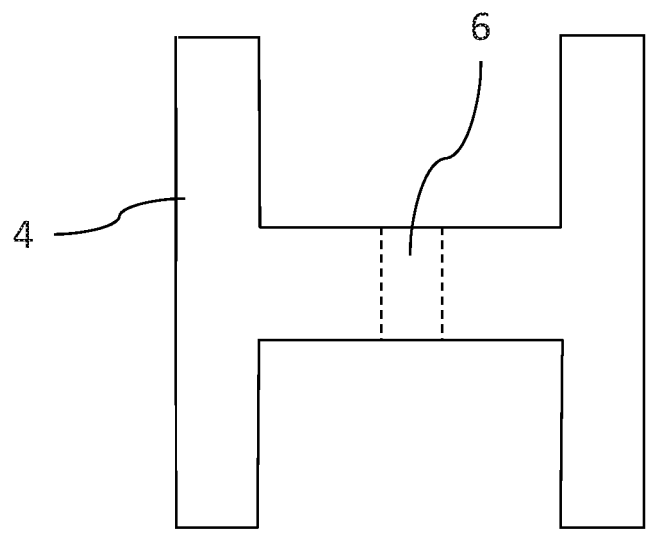
FIG. 1 Section through H-shaped profile.

FIG. 1 shows a section through an H-shaped profile as used in the sealing system according to the invention. The H-shaped profile is marked 4. The profile may be made of any known flexible material that is used for seals. Like the letter H, the cross-section of the profile has two vertical parallel shaft-like regions that are connected by an horizontal region positioned between them. The horizontal region is arranged in such a way that a space remains open between the respective vertical regions on both sides of the horizontal region. In other words, the horizontal region must not connect the two vertical regions in such a way that it would be arranged at the very end of the vertical regions. In this case, the profile would no longer be H-shaped; instead, the term U-shaped would be much more appropriate. The terms "vertical" and "horizontal" used do not indicate the orientation of the sealing system in the final installed state or during assembly in a larger system. During assembly, depending on the embodiment, it is only necessary to ensure that the curing liquid used may be introduced in such a way that it is able to reach the intended points of the sealing system. After the liquid has cured, the sealing system may then be oriented in any position. It is advantageous if the horizontal region of the H-shaped profile has 4 through openings, as this makes it easier to fill in the curing liquid (see below). In FIG. 1, one such opening is indicated with the dashed lines and marked with 6.

Figure 2:
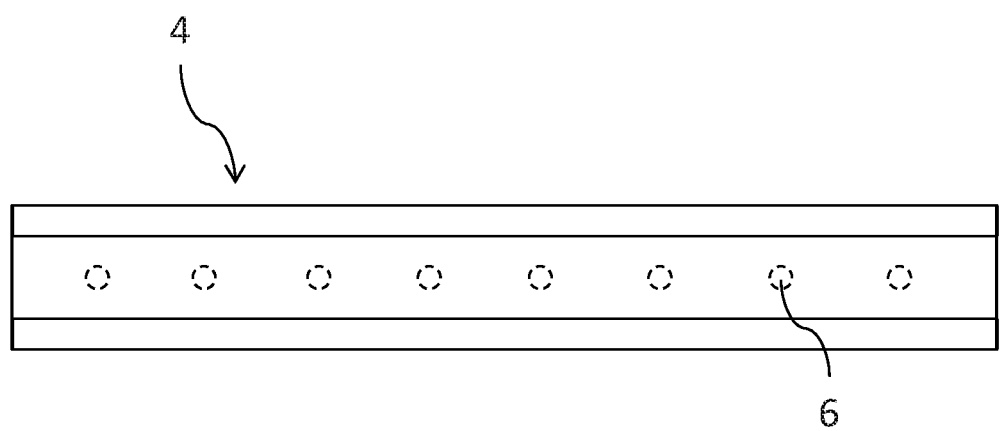
FIG. 2 Top view of H-shaped profile.

FIG. 2 shows a top view of the H-shaped profile 4. The same designations are used as in FIG. 1. The optional openings 6, of which only one is marked, are arranged centrally at regular intervals in the horizontal region of the profile 4. The position of the openings 6 is shown only by way of example. The openings 6 in the horizontal region of the profile 4 may be arranged in any other conceivable way.

Figure 3:
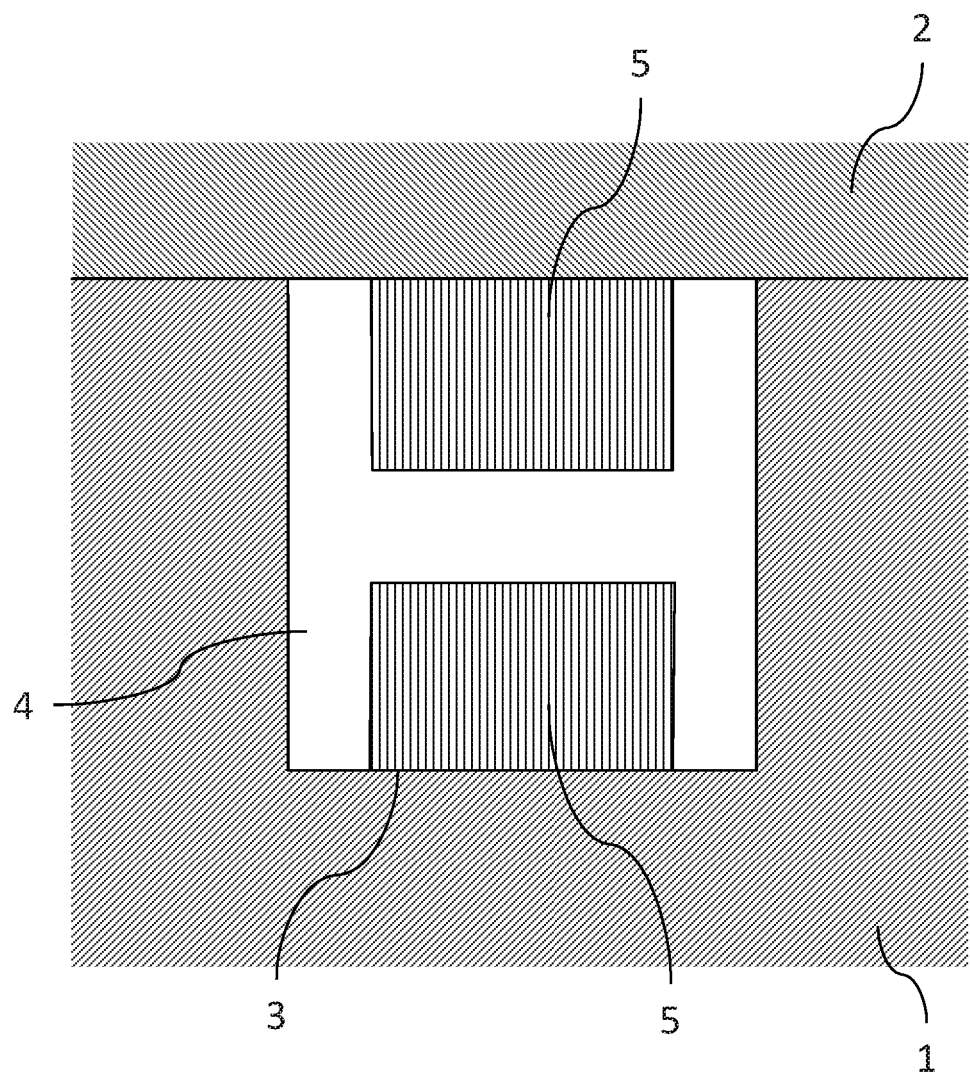
FIG. 3 First embodiment of sealing system according to the invention.

FIG. 3 shows a section through a first embodiment of the sealing system according to the invention. A first body is marked with 1 and a second body is marked with 2. The first body 1 has a groove that is marked with 3. The H-shaped profile 4 is arranged in the groove 3 in such a way that the horizontal regions of the profile 4 directly abut the side walls of the groove 3. Clearly, the side walls of the groove 3 must be parallel to one another. The first body 1 is connected to the second body 2. The connection means are not shown in FIGS. 3 to 6. As a rule, the two bodies 1 and 2 are screwed together, but all other known connection means may also be used, for example clamps. The space between the vertical regions of the H-shaped profile 4 is filled with the cured liquid. This space is divided into two subspaces, one above and one below the horizontal region of the profile 4; these are respectively marked 5. The liquid used here must retain sufficient elasticity in the cured state. It is advantageous if the elasticity of the cured liquid is approximately equal to the elasticity of the profile 4. In the embodiment shown, the body 1 directly abuts the body 2 and the H-shaped profile is flush with the surface of the body 1 that abuts the body 2. The cured liquid glues the base surface of the groove 3 to the profile 4 and glues the surface of the body 2 that abuts the body 1 to the profile 4. The profile 4, in contrast, adjoins the side walls of the groove 3 without adhesion. This allows bodies 1 and 2 to be easily lifted from one another without the seal breaking, because in this case the profile 4 contracts in the horizontal direction. This is possible because there is no adhesive bond between the vertical regions of the profile 4 and the side walls of the groove 3. This also causes a deformation of the cured liquid 5. However, a lateral displacement of bodies 1 and 2 relative to one another must be avoided, because in this case the adhesive bond between the profile 4 and the body 2 would be destroyed very quickly.

Figure 4:
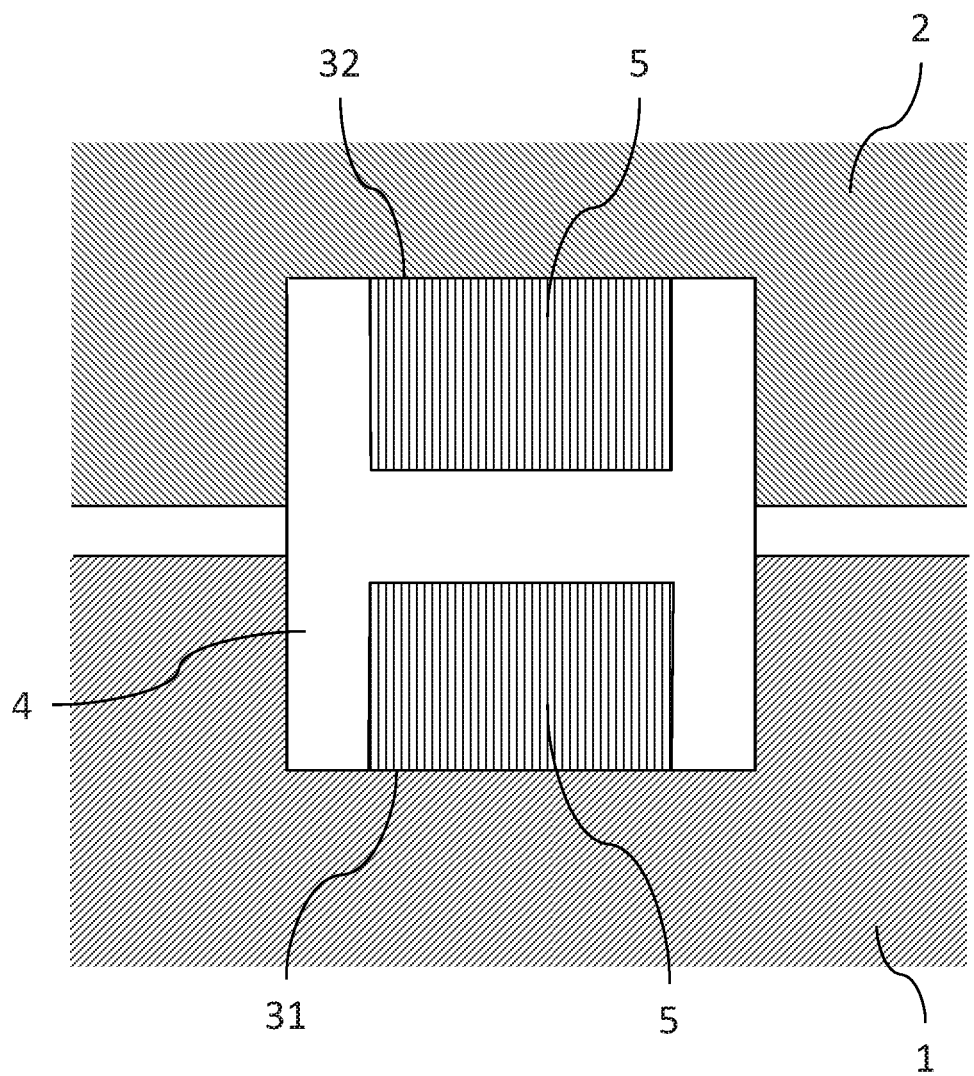
FIG. 4 Second embodiment of sealing system according to the invention.

FIG. 4 shows an embodiment according to the invention that also allows slight lateral displacements of the bodies relative to one another. The reference numerals correspond to those used in FIG. 3. In contrast to the FIG. 3 embodiment, in FIG. 4 each of the two bodies 1 and 2 has a groove, and these grooves are arranged opposite one another. The two grooves are marked 31 and 32. In addition, a distance between the bodies 1 and 2 is provided. The H-shaped profile in this case is arranged in both grooves 31 and 32 in such a way that the horizontal regions of the profile 4 each respectively directly abut the side walls of the grooves 31 and 32. The two subspaces between the vertical regions of the H-shaped profile 4 are in turn filled with the cured liquid. The cured liquid glues the base surface of the groove 31 to the profile 4 and glues the base surface of the groove 32 to the profile 4. Due to the distance between the two bodies 1 and 2 and the elasticity of the profile 4 and the cured liquid 5, in this embodiment there may be slight lateral displacements between the bodies 1 and 2 without leaks occurring. With regard to a withdrawal of the bodies 1 and 2, the same applies as was stated for FIG. 3. The two bodies 1 and 2 may also be brought together to a certain degree as long as the elasticity of the profile 4 is sufficient to avoid extrusion thereof. FIG. 4 shows that the flange connection system in this embodiment is symmetrical with respect to the bodies 1 and 2. This symmetry may, however, be broken, for example, by one of the grooves 31 and 32 being deeper than the other groove. In this case, it may be advantageous if the H-shaped profile 4 is also asymmetrical (see FIG. 6).

Clearly, the FIG. 3 embodiment may also be modified by providing a distance between bodies 1 and 2 in order to absorb the additional displacements of the bodies 1 and 2 that were mentioned for the FIG. 4 embodiment, without leakage. In that case, of course, the profile 4 is no longer ends flush with the surface of the body 1, but protrudes from the groove 3.

As a general rule, all appropriate combinations of the embodiments of the invention shown in FIGS. 3 to 7 are encompassed by the present text, even if these combinations are not explicitly mentioned.

Figure 5:
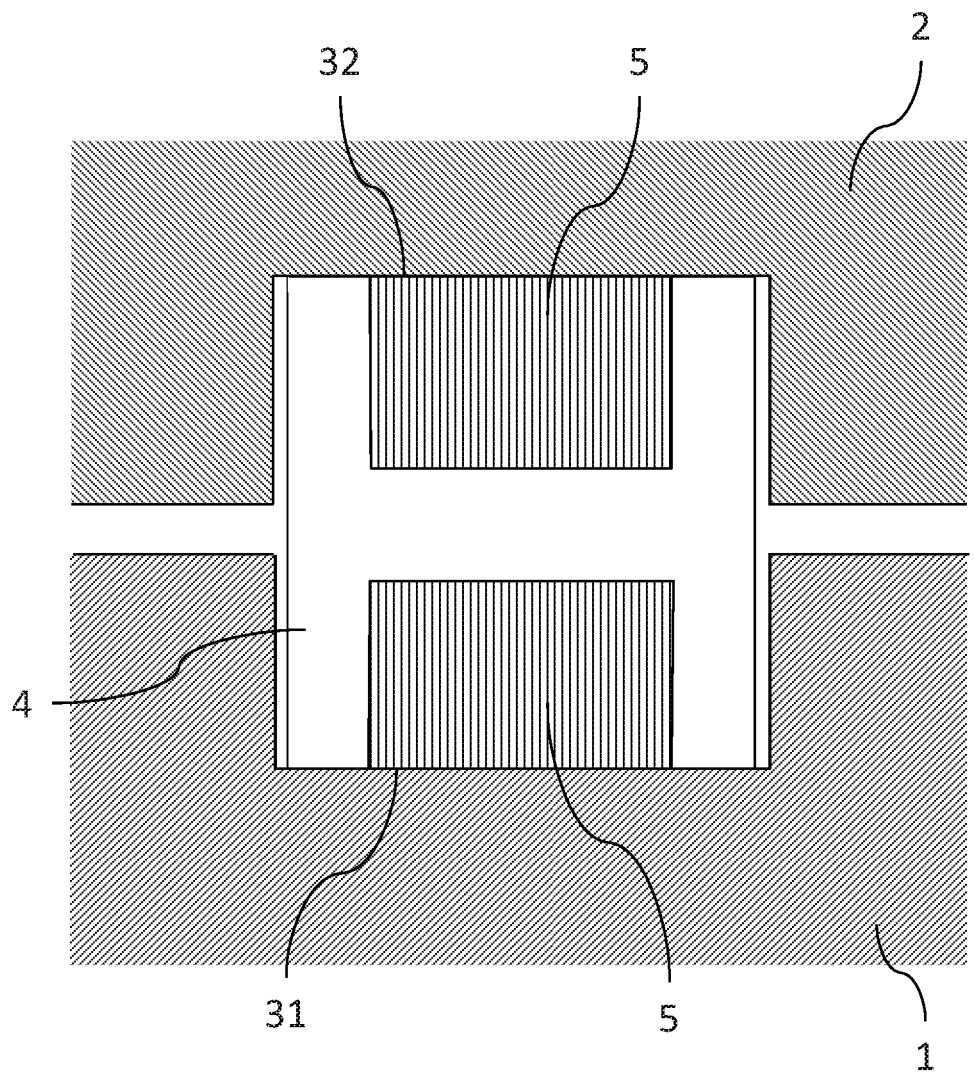
FIG. 5 Third embodiment of sealing system according to the invention.

FIG. 5 shows another embodiment that differs from the embodiment shown in FIG. 4 in that the profile 4 no longer directly abuts the parallel side walls of the grooves 31 and 32. The vertical sections of the profile 4 run parallel to the side walls of the grooves 31 and 32, with a free space extending between them. This results in a higher tolerance of the sealing system to lateral displacements between the bodies 1 and 2 and to the two bodies approaching one another.

The embodiments according to FIGS. 3, 4 and 5 are further characterized in that they may be used to easily and reliably create branches in the sealing process. The profile 4 is cut so as to correspond to the course of the grooves 3, 31 and 32 and is inserted into these grooves. The profiles may optionally be glued together at the joints. Subsequently, the bodies 1 and 2 are connected together and the curing liquid 5 is introduced into the spaces between the vertical regions of the profiles 4. After the liquid 5 has cured, the above-mentioned bondings occur. At the joints, the liquid 5 likewise ensures that the joints are bonded after curing. In order for the liquid 5 to be introduced into the spaces mentioned, at least one of the bodies must have at least one opening for introducing the liquid. In addition, at least one opening must be provided in one of the bodies through which the air that the introduced liquid 5 displaces may escape when the liquid 5 is introduced. If the profile 4 does not comprise any openings 6 in the horizontal region, these openings must be provided in both bodies. In order to achieve a good and bubble-free distribution of the liquid 5 that is filled into the spaces, the liquid may also be introduced under pressure. This may be supported by placing the bodies 1 and 2 on a vibrating surface. Notably, small air inclusions in the cured liquid 5, in numbers that are not excessive, do not impair the functioning of the sealing system according to the invention.

Figure 6:
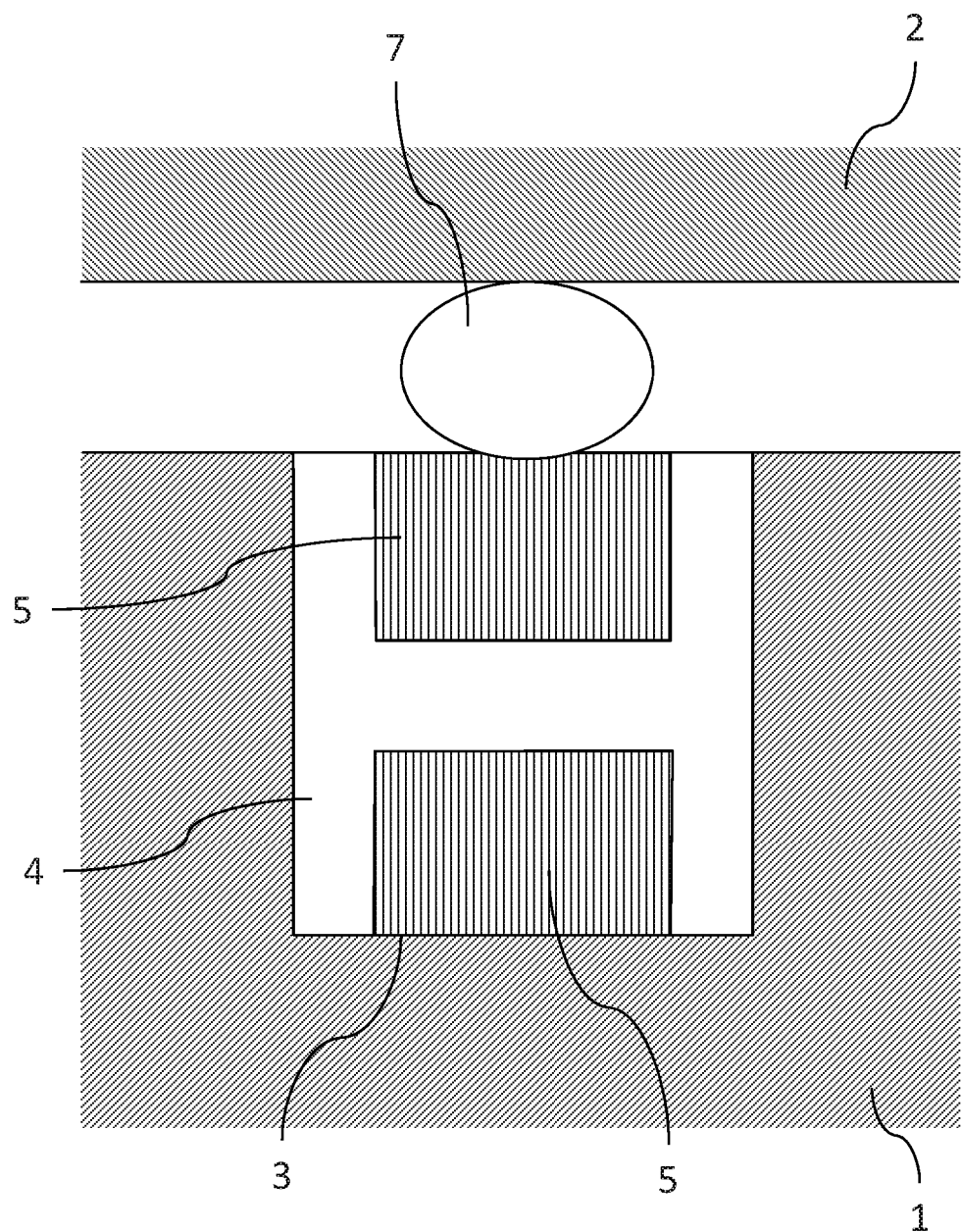
FIG. 6 Fourth embodiment of sealing system according to the invention.
Figure 7:
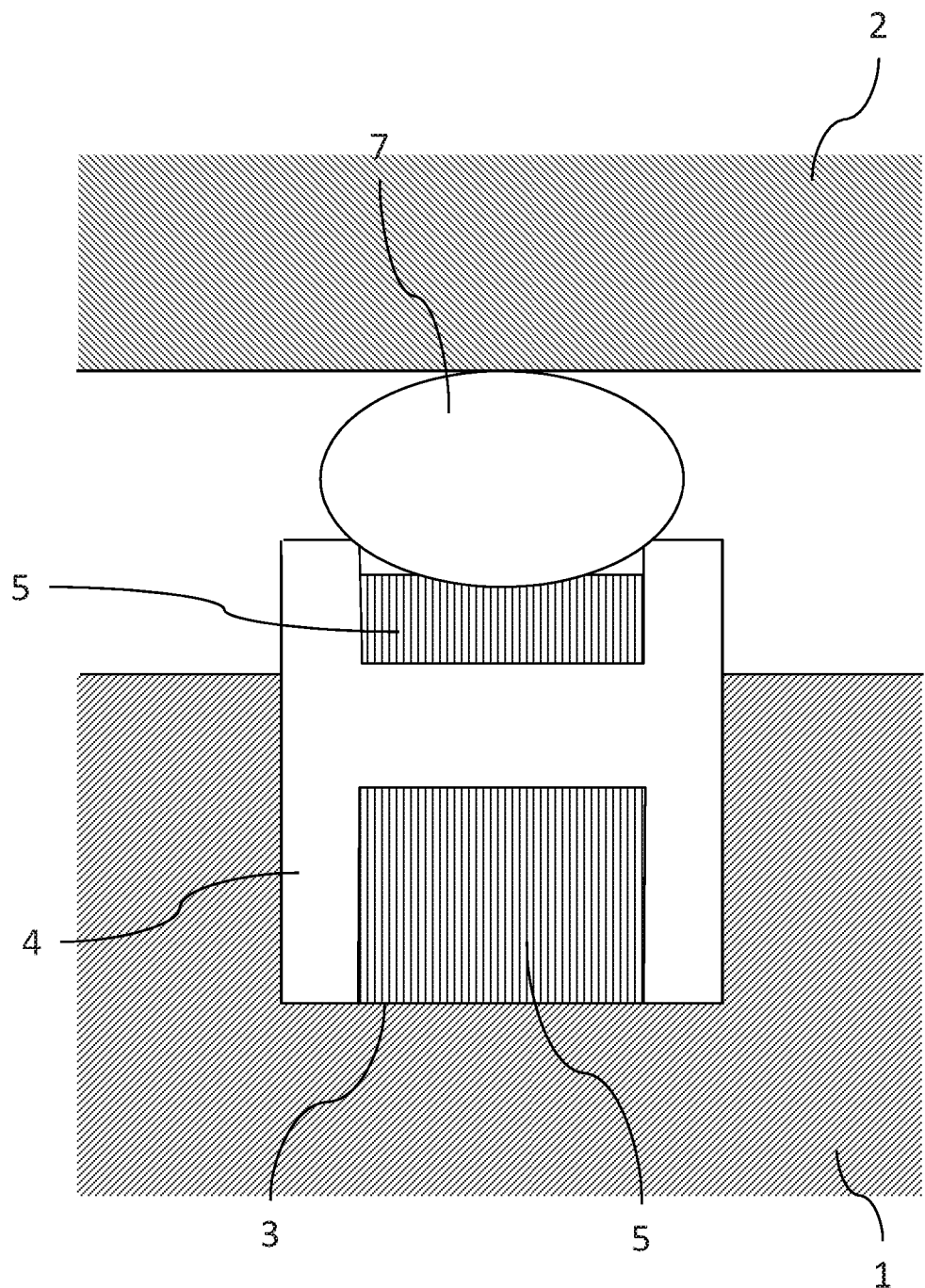
FIG. 7 Fifth embodiment of sealing system according to the invention.

The following embodiments of the sealing system according to the invention as shown in FIGS. 6 and 7 feature an additional sealing element in addition to the H-shaped profile 4. These embodiments are less advantageous from a branching standpoint, but offer other advantages compared to conventional sealing systems.

The embodiment shown in FIG. 6, in the lower region, is very similar to the embodiment shown in FIG. 3. In FIG. 6, there is another sealing element marked 7, between the cured liquid 5 above the horizontal part of the profile 4 and the body 2. This may for example be a conventional O-ring. The sealing element 7 in this case is compressed and simultaneously pressed into the adjacent cured liquid 5, because this liquid is able to yield due to its elasticity. This results in a bed for the sealing element 7, so that this element may no longer slip so easily in a lateral direction. In addition, the sealing effect between body 1 and the sealing element 7 is particularly good as a result. An additional advantage is that the sealing element 7 is damaged only at higher pressures between the bodies 1 and 2, compared to a conventional flange connection. For further guidance of the sealing element 7, a groove may be provided in the body 2, and/or the profile 4 together with the cured liquid 5 may be sunk into the body 1.

In the case of the embodiment shown in FIG. 7, the H-shaped profile does not end flush with the surface of the body 1, but protrudes partially therefrom. Optionally, as shown in FIG. 7, the space above the horizontal region of the H-shaped profile 4 may not be completely filled by the cured liquid 5. This likewise results in an improved guidance of the sealing element 7. It is even possible that there is no cured liquid 5 at all in the space above the horizontal region of the H-shaped profile 4 (for example in order to save material). An additional advantage of the embodiment shown in FIG. 7 is that in this way, larger gaps between the connected bodies 1 and 2 may be sealed. Another difference from the foregoing embodiments is that the H-shaped profile 4 is not symmetrical to the horizontal region of the same, i.e. the parts of the vertical region arranged below the horizontal region are longer than those arranged above the horizontal region. Such an asymmetry may influence the stiffness of this complex (the profile 4 and the cured liquid 5 connected thereto), according to the ratio of the elastic moduli of the materials used in the profile 4 and cured liquid 5 to one another.

For all embodiments according to the invention, the assembly method may be modified so that the curing liquid 5 is introduced before the bodies 1 and 2 are connected together. If the horizontal region of the profile 4 contains openings 6, then there is no need for additional measures to discharge the air displaced by the liquid 5, because this air may easily escape upwards. As a rule, openings in the body 1 for introducing the liquid 5 may then also be omitted, because the liquid 5 may simply be filled in from above. It is also possible to observe clearly whether the liquid 5 has been evenly distributed, because the body 2 does not block the view in this case. For the embodiments shown in FIGS. 6 and 7, the sealing element 7 is arranged above the profile 4 and the cured liquid 5 and the body 2 are connected to the body 1, only after the liquid 5 has cured. Optionally, the sealing element 7 may also be arranged above the profile 4 and the liquid 5 before the liquid 5 has cured. If this is done, the sealing element 7 adheres to the liquid 5, which may be advantageous in some cases because it prevents the sealing element 7 from slipping laterally. For additional guidance of the sealing element 7, a groove may be furnished in the body 2. For the embodiments shown in FIGS. 3, 4 and 5, the body 2 is joined to the body 1 before the liquid hardens so that the profile 4 may adhere to the body 2. For the embodiment shown in FIG. 5, the liquid 5 may advantageously also be introduced in two working steps. In order for the profile 4 to be centered in the grooves 31 and 32, advantageously, suitable spacers are arranged between the groove walls and the horizontal regions of the profile 4 before the liquid 5 is introduced. In this case, first, only a part of the liquid 5 is introduced, so that the profile 4 is fixed in the region of the base of the groove 31 after it has cured. The spacers may then be removed again. The remaining liquid 5 is then introduced and the body 2 is connected with the body 1 before the remaining liquid 5 is cured, so the profile 4 may adhere to the body 2 in the base region of the groove 32. A central arrangement of the profile 4 in the groove 32 may be achieved by means of suitable guides between the two bodies 1 and 2. The mentioned spacers may also comprise means that make is possible to slightly the profile 4 somewhat into the groove 31. This may be advantageous in order to prevent the liquid 5 from flowing under the profile 4. Such means may also be advantageously used for other embodiments that do not require spacers.

Because it is important, in assembling the system, that the curing liquid 5 may reach all intended locations in the system, the viscosity of the curing liquid 5 should be adapted to the manner in which the liquid 5 is introduced. If the liquid 5 is introduced into the profile 4 via openings in the bodies 1 and 2, it is usually favorable if the liquid 5 has a low viscosity. However, if the liquid 5 is introduced as described in the previous section before the body 2 is connected to the body 1, then the liquid 5 may have a higher viscosity. It is also conceivable and advantageous for the liquid 5 to have such a high viscosity that it assumes the consistency of a paste and is coated or pressed into profile 4 with a spatula or the like. In this way, unwanted dripping may be prevented. In addition, a liquid 5 with a higher viscosity has less tendency to run into regions that the liquid 5 should not enter (for example the space between the inner walls of the groove and the profile 4). The undesired adhesion of the profile 4 to the inner walls of the grooves may also be prevented by treating the outer sides of the profile 4 with a suitable anti-stick agent.

Suitable substances for the liquid 5, by way of example, are two-component polyurethane resins and silicones; of these, the former may have a low viscosity and the latter may have a pasty consistency.

Figure 8:
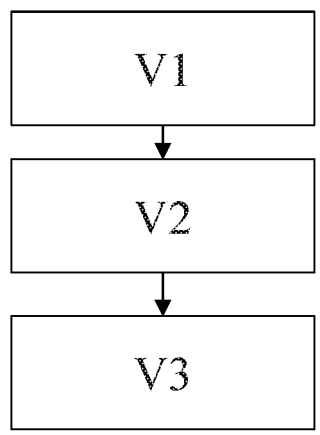
FIG. 8 Method of assembling the sealing system according to the invention.

FIG. 8 shows the schematic progression of the assembly method. In its general form, the method comprises the steps V1, V2 and V3 executed in that sequence. In step V1, the bodies 1 and 2 are provided, together with the required groove(s) and openings. In V2, the H-shaped profile 4 is cut to size and inserted into a groove in body 2, and any joints that are present may be glued. In step V3, the curing liquid 5 is introduced into the space between the vertical regions of the profile 4, and then hardens. Depending on the embodiment, the bodies 1 and 2 are joined together at the end of step V2 or at the end of step V3; in the latter case, if appropriate, the sealing element 7 may first be arranged above the profile 4 and the cured liquid 5.

Finally, it should be mentioned that the flange sealing system according to the invention may also comprise arrangements in which one of the bodies 1 or 2 is made up of a plurality of sub-bodies, for example if the body 1 must be sealingly connected to a plurality of bodies that are arranged above its surface. The above-described embodiments may also be combined, for example if the connection between the body 1 and one of the other bodies is made as shown in FIG. 3 and the connection between the body 1 and another of the additional bodies is made as shown in FIG. 6. Of course, combinations with flange sealing systems that are already known in the art are also possible.

The invention claimed is:

1. A flange sealing system, comprising:
    two bodies each having a respective flat surface and being connected to one another with said surfaces facing one another;
    at least one of said two bodies having a groove with parallel side walls and a base surface recessed in said flat surface;
    an elastic profile with an H-shaped cross-section disposed in said groove, said elastic profile having vertical regions and at least a part of said vertical regions of the elastic profile being arranged parallel to said side walls of said groove;
    an elastic mass formed by a cured liquid disposed in at least one portion of a space between said vertical regions of said elastic profile, said elastic mass formed by the cured liquid being arranged to adhesively connect said elastic profile to said groove in a region of said base surface of said groove.

2. The flange sealing system according to claim 1, wherein said H-shaped profile has a horizontal region formed with at least one through opening.

3. The flange sealing system according to claim 1, wherein said elastic mass formed by the cured liquid is arranged to fill a space between said vertical regions of said elastic profile.

4. The flange sealing system according to claim 1, wherein said elastic profile is flush with said flat surface of said body in which said profile is arranged.

5. The flange sealing system according to claim 1, wherein said elastic profile projects from said flat surface of said body in which said profile is arranged.

6. The flange sealing system according to claim 1, wherein said flat surfaces of said two bodies adjoin one another directly.

7. The flange sealing system according to claim 6, wherein said elastic mass formed by the cured liquid is arranged to fill a space between said vertical regions of said elastic profile, and one of said bodies has no groove and said elastic profile is adhesively bonded to the flat surface of said body by way of said elastic mass formed by the cured liquid.

8. The flange sealing system according to claim 1, wherein said flat surfaces of said two bodies are disposed to form a free space therebetween.

9. The flange sealing system according to claim 8, wherein said elastic mass formed by the cured liquid is arranged to fill a space between said vertical regions of said elastic profile, and one of said bodies has no groove and said elastic profile is adhesively bonded to the flat surface of said body by way of said elastic mass.

10. The flange sealing system according to claim 1, wherein said flat surfaces of said two bodies each has a respective recessed groove formed therein with parallel side walls that are arranged opposite one another.

11. The flange sealing system according to claim 10, wherein said elastic mass formed by the cured liquid is arranged to fill a space between said vertical regions of said elastic profile, and said elastic profile with the H-shaped cross-section is arranged in the grooves in such a way that at least a part of the vertical regions of said elastic profile is arranged parallel to said side walls of said grooves, and said profile is adhesively connected to said grooves at said base surfaces of said grooves.

12. The flange sealing system according to claim 1, further comprising an additional sealing element arranged between said elastic profile and one of said two bodies.

13. The flange sealing system according to claim 1, wherein at least one of said two bodies is formed with openings for enabling a liquid to be filled into the space between the vertical regions of said profile, wherein the liquid is to be cured to form the elastic mass.

14. The flange sealing system according to claim 1, wherein the portions of the vertical regions of said profile that are arranged parallel to said side walls of a groove are directly adjacent to but not connected to said side walls of said groove.

15. The flange sealing system according to claim 1, wherein a free space is formed between the parts of the vertical portions of said elastic profile that are arranged parallel to the side walls of a groove, and said side walls of said groove.

16. A method for assembling a flange sealing system according to claim 1, the method comprising the following steps in the following order:
V1: providing two bodies each having a respective flat surface and at least one of the two bodies having a groove with parallel side walls and a base surface recessed in the flat surface;
V2: cutting to size an elastic profile with an H-shaped cross-section having vertical regions, and inserting the profile into the groove with at least a part of the vertical regions of the H-shaped elastic profile being arranged parallel to the side walls of the groove;
V3: filling a curing liquid into the space between the vertical regions of the elastic profile, and curing the curing liquid to form an elastic mass.

17. The method according to claim 16, which comprises connecting the two bodies at an end of step V2 or step V3.

18. The method according to claim 16, which comprises connecting the two bodies at an end of step V3, and wherein step V3 further comprises arranging an additional sealing element above the elastic profile after the curing liquid is filled in and before the two bodies are joined.

* * * * *